US012365332B2

(12) United States Patent
Kim (10) Patent No.: US 12,365,332 B2
(45) Date of Patent: Jul. 22, 2025

(54) APPARATUS FOR ASSISTING DRIVING AND METHOD THEREOF (71) Applicant: MANDO MOBILITY SOLUTIONS CORPORATION, Pyeongtaek-si (KR)

(72) Inventor: Inhan Kim, Seongnam-si (KR)

(73) Assignee: HL KLEMOVE CORP., Incheon (KR)

(*) Notice: Subject to any disclaimer, the term of this patent is extended or adjusted under 35 U.S.C. 154(b) by 364 days.

(21) Appl. No.: 17/718,698

(22) Filed: Apr. 12, 2022

(65) Prior Publication Data
US 2022/0332311 A1 Oct. 20, 2022

(30) Foreign Application Priority Data

Apr. 20, 2021 (KR) .................. 10-2021-0051164

(51) Int. Cl.
B60W 30/09 (2012.01)
B60W 10/18 (2012.01)
B60W 10/20 (2006.01)
B60W 30/095 (2012.01)
B60W 40/04 (2006.01)
(Continued)

(52) U.S. Cl.
CPC ............ *B60W 30/09* (2013.01); *B60W 10/18* (2013.01); *B60W 10/20* (2013.01); *B60W 30/0956* (2013.01); *B60W 40/04* (2013.01); *B60W 50/0097* (2013.01); *G01S 13/931* (2013.01); *G06V 20/58* (2022.01); *B60W 2420/403* (2013.01); *B60W 2420/408* (2024.01); *B60W 2554/4041* (2020.02);
(Continued)

(58) Field of Classification Search
CPC .... G05D 1/0246; G01C 21/34; G01S 13/931; G01S 17/931; G06V 20/56; G06V 10/10; H04N 23/72; H04N 23/70; H04N 23/62; H04N 23/54; H04N 23/57; H04N 23/74; H04N 23/76
See application file for complete search history.

(56) References Cited

U.S. PATENT DOCUMENTS 10,671,076 B1 * 6/2020 Kobilarov .............. G08G 1/166
10,928,820 B1 * 2/2021 Tao ................. B60W 60/00274
(Continued)

FOREIGN PATENT DOCUMENTS

KR  10-0946525 B1  3/2010
KR  20190035255 A  4/2019
(Continued)

OTHER PUBLICATIONS

KR OA dated Sep. 27, 2023.

*Primary Examiner* — Peter D Nolan
*Assistant Examiner* — Demetra R Smith-Stewart
(74) *Attorney, Agent, or Firm* — Harvest IP Law, LLP (57) ABSTRACT Disclosed herein an apparatus for assisting driving of a vehicle includes a camera installed in the vehicle, the camera having a field of view around the vehicle and obtaining image data; and a controller configured to process the image data. The controller may identify at least one object located around the vehicle based on processing the image data, update a trajectory of the vehicle based on an interference between a trajectory of the at least one object and the trajectory of the vehicle, control at least one of a driving device, a braking device, and a steering device of the vehicle based on the updated trajectory of the vehicle.

12 Claims, 5 Drawing Sheets (51) Int. Cl.
 *B60W 50/00* (2006.01)
 *G01S 13/931* (2020.01)
 *G06V 20/58* (2022.01)
(52) U.S. Cl.
 CPC ............ *B60W 2554/4043* (2020.02); *B60W 2554/4045* (2020.02); *B60W 2554/80* (2020.02)

(56) References Cited

U.S. PATENT DOCUMENTS

| | | | |
|---|---|---|---|
| 11,858,502 B2* | 1/2024 | Shimizu | B60W 40/02 |
| 2019/0071093 A1* | 3/2019 | Ma | G05D 1/0214 |
| 2019/0317511 A1* | 10/2019 | Xu | G05D 1/0214 |
| 2021/0129834 A1* | 5/2021 | Gier | G05D 1/0088 |
| 2021/0133466 A1* | 5/2021 | Gier | G05D 1/0223 |

FOREIGN PATENT DOCUMENTS

| | | |
|---|---|---|
| KR | 20190064229 A | 6/2019 |
| KR | 10-2127741 B1 | 7/2020 |

* cited by examiner

APPARATUS FOR ASSISTING DRIVING AND METHOD THEREOF

CROSS-REFERENCE TO RELATED APPLICATION(S)

This application is based on and claims priority under 35 U.S.C. § 119 to Korean Patent Application No. 10-2021-0051164, filed on Apr. 20, 2021 in the Korean Intellectual Property Office, the disclosure of which is incorporated herein by reference in its entirety.

TECHNICAL FIELD

The disclosure relates to an apparatus and method for assisting driving of a vehicle, and more particularly, to an apparatus and method for assisting driving of a vehicle capable of detecting objects located in a vicinity of the vehicle.

BACKGROUND

In general, a vehicle is the most common means of transportation in modern society, and the number of people using vehicles is increasing. The development of vehicle technologies has advantages such as ease of movement over long distances and convenience of life, but also has disadvantages of deteriorating road traffic conditions in a place with a high population density such as Korea, resulting in causing serious traffic congestion.

Recently, studies of a vehicle equipped with Advanced Driver Assist System (ADAS) that actively provides information on a vehicle condition, a driver condition, and/or a surrounding environment in order to reduce a burden on a driver and increase convenience is actively ongoing.

As an example of ADAS mounted on a vehicle may include Lane Departure Warning (LDW), Lane Keeping Assist (LKA), High Beam Assist (HBA), Automatic Emergency Braking (AEB), Traffic Sign Recognition (TSR), Adaptive Cruise Control (ACC), or Blind Spot Detection (BSD).

ADAS may collect information about surrounding environments and process the collected information. Furthermore, ADAS may recognize objects and design a route for a vehicle to be traveled based on a result of processing the collected information.

However, such a conventional ADAS controls a movement of a vehicle only depending on information (location information and movement information) related to a selected target.

SUMMARY

An aspect of the disclosure is to provide an apparatus and method for assisting driving of a vehicle capable of predicting trajectories of a plurality of objects located in a vicinity of the vehicle.

Additional aspects of the disclosure will be set forth in part in the description which follows and, in part, will be obvious from the description, or may be learned by practice of the disclosure.

In accordance with an aspect of the disclosure, an apparatus for assisting driving of a vehicle includes a camera installed in the vehicle, the camera having a field of view around the vehicle and obtaining image data; and a controller configured to process the image data, wherein the controller is configured to identify at least one object located around the vehicle based on processing the image data, update a trajectory of the vehicle based on an interference between a trajectory of the at least one object and the trajectory of the vehicle, control at least one of a driving device, a braking device, and a steering device of the vehicle based on the updated trajectory of the vehicle.

The controller may project the trajectory of the vehicle and a predicted trajectory of the at least one object on one coordinate system, and identify whether the trajectory of the vehicle interferes with the trajectory of the at least one object on the one coordinate system.

The controller may identify at least one of a lateral speed, a lateral acceleration, an align angle, a longitudinal speed, or a longitudinal acceleration of the at least one object based on the processing of the image data.

The controller may identify whether the at least one object changes a lane based on at least one of the lateral speed, the lateral acceleration, or the align angle of the at least one object.

The controller may predict a lateral trajectory of the at least one object based on at least one of the lateral speed, the lateral acceleration, or the align angle of the at least one object, predict a longitudinal trajectory of the at least one object based on the longitudinal speed or longitudinal acceleration of the at least one object, and predict the trajectory of the at least one object based on the lateral trajectory and the longitudinal trajectory.

The controller may generate the trajectory of the vehicle based on a route to a destination obtained from a navigation device of the vehicle.

The controller may predict the trajectory of the vehicle based on at least one of a speed, an acceleration, or an angular velocity of the vehicle.

The controller may update the trajectory of the vehicle to avoid the trajectory of the at least one object in response to that the trajectory of the vehicle interferes with the trajectory of the at least one object.

The apparatus may further include a radar installed in the vehicle, the radar having a field of view around the vehicle and obtaining radar data; wherein the controller is configured to identify at least one object located around the vehicle based on processing the radar data, and integrate the at least one object based on the processing the image data and the at least one object based on the processing the radar data.

In accordance with another aspect of the disclosure, a method of assisting driving of a vehicle includes obtaining image data by a camera installed in the vehicle and having a field of view around the vehicle; identifying at least one object located around the vehicle based on processing of the image data by a processor installed in the vehicle; updating a trajectory of the vehicle based on an interference between a trajectory of the at least one object and the trajectory of the vehicle; and controlling at least one of a driving device, a braking device, or a steering device of the vehicle based on the updated trajectory of the vehicle.

The method may further include projecting the trajectory of the vehicle and a predicted trajectory of the at least one object on one coordinate system, and identifying whether the trajectory of the vehicle interferes with the trajectory of the at least one object on the one coordinate system.

The method may further include identifying at least one of a lateral speed, a lateral acceleration, an align angle, a longitudinal speed, or a longitudinal acceleration of the at least one object based on the processing of the image data.

The method may further include identifying whether the at least one object changes a lane based on at least one of the lateral speed, the lateral acceleration, or the align angle of the at least one object.

The method may further include predicting a lateral trajectory of the at least one object based on at least one of the lateral speed, the lateral acceleration, or the align angle of the at least one object, predicting a longitudinal trajectory of the at least one object based on the longitudinal speed or longitudinal acceleration of the at least one object, and predicting the trajectory of the at least one object based on the lateral trajectory and the longitudinal trajectory.

The method may further include generating the trajectory of the vehicle based on a route to a destination obtained from a navigation device of the vehicle.

The method may further include predicting the trajectory of the vehicle based on at least one of a speed, an acceleration, or an angular velocity of the vehicle.

The method may further include updating the trajectory of the vehicle to avoid the trajectory of the at least one object in response to that the trajectory of the vehicle interferes with the trajectory of the at least one object.

The method may further include obtaining radar data, by a radar, installed in the vehicle and having a field of view around the vehicle; identifying at least one object located around the vehicle, by the processor, based on processing the radar data, and integrate the at least one object, by the processor, based on the processing the image data and the at least one object based on the processing the radar data.

In accordance with another aspect of the disclosure, a computer-readable storage medium storing a program for executing the method of assisting driving of a vehicle.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Like numerals refer to like elements throughout the specification. Not all elements of embodiments of the disclosure will be described, and description of what are commonly known in the art or what overlap each other in the embodiments will be omitted.

It will be further understood that the term "connect" or its derivatives refer both to direct and indirect connection, and the indirect connection includes a connection over a wireless communication network.

It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof, unless the context clearly indicates otherwise.

Further, when it is stated that a member is "on" another member, the member may be directly on the other member or a third member may be disposed therebetween.

Terms such as "~ unit", "~ group", "~ block", "~ member", and "~ module" used in the specification may be implemented in software or hardware. Terms such as "~ unit", "~ group", "~ block", "~ member", and "~ module" may refer to a unit that processes at least one function or operation. In addition, terms such as "~ unit", "~ group", "~ block", "~ member", and "~ module" are used in at least one piece of hardware such as a field-programmable gate array (FPGA)/application specific integrated circuit (ASIC), or at least one software or processor stored in a memory.

Although the terms "first," "second," "A," "B," etc. may be used to describe various components, the terms do not limit the corresponding components, but are used only for the purpose of distinguishing one component from another component.

As used herein, the singular forms "a," "an" and "the" are intended to include the plural forms as well, unless the context clearly indicates otherwise.

Reference numerals used for method steps are just used for convenience of explanation, but not to limit an order of the steps. Thus, unless the context clearly dictates otherwise, the written order may be practiced otherwise.

Hereinafter, operating principles and embodiments of the disclosure will be described with reference to the accompanying drawings.

Figure 1:
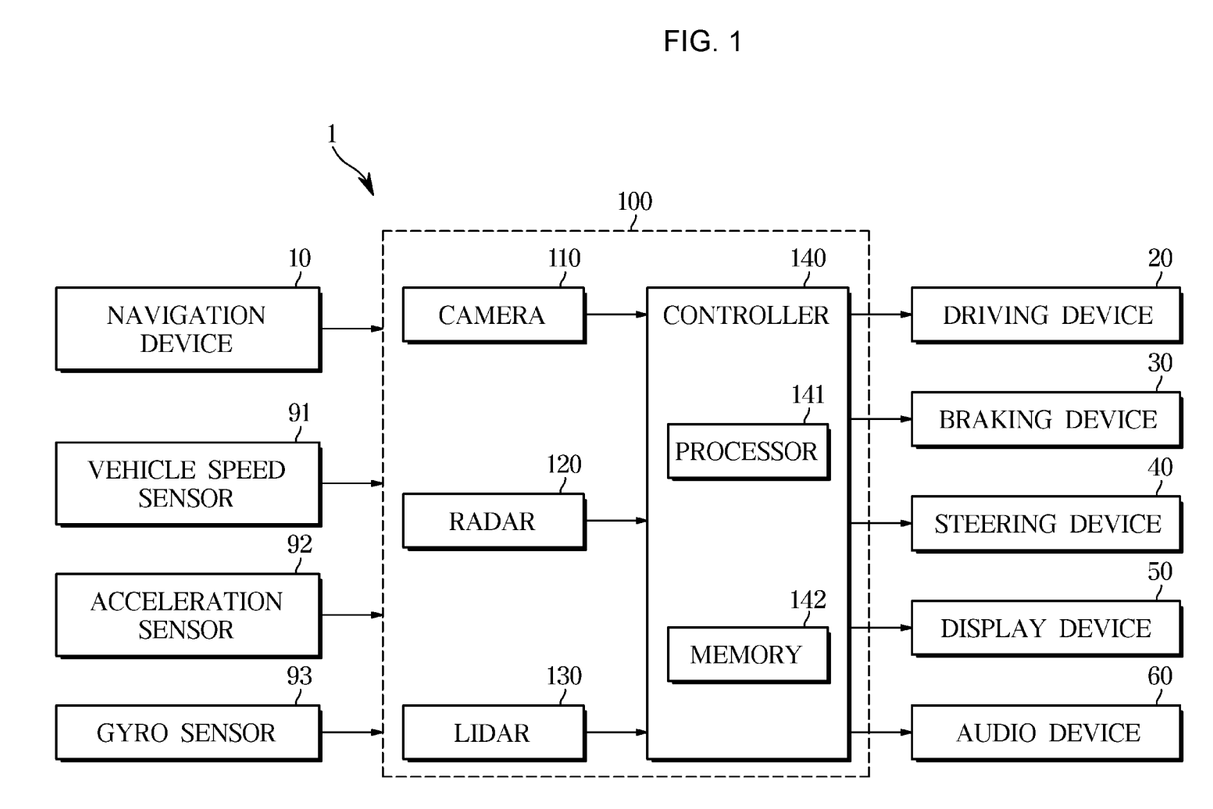
FIG. 1 is a view illustrating a configuration of a vehicle and a driver assistance device according to an embodiment of the disclosure.
Figure 2:
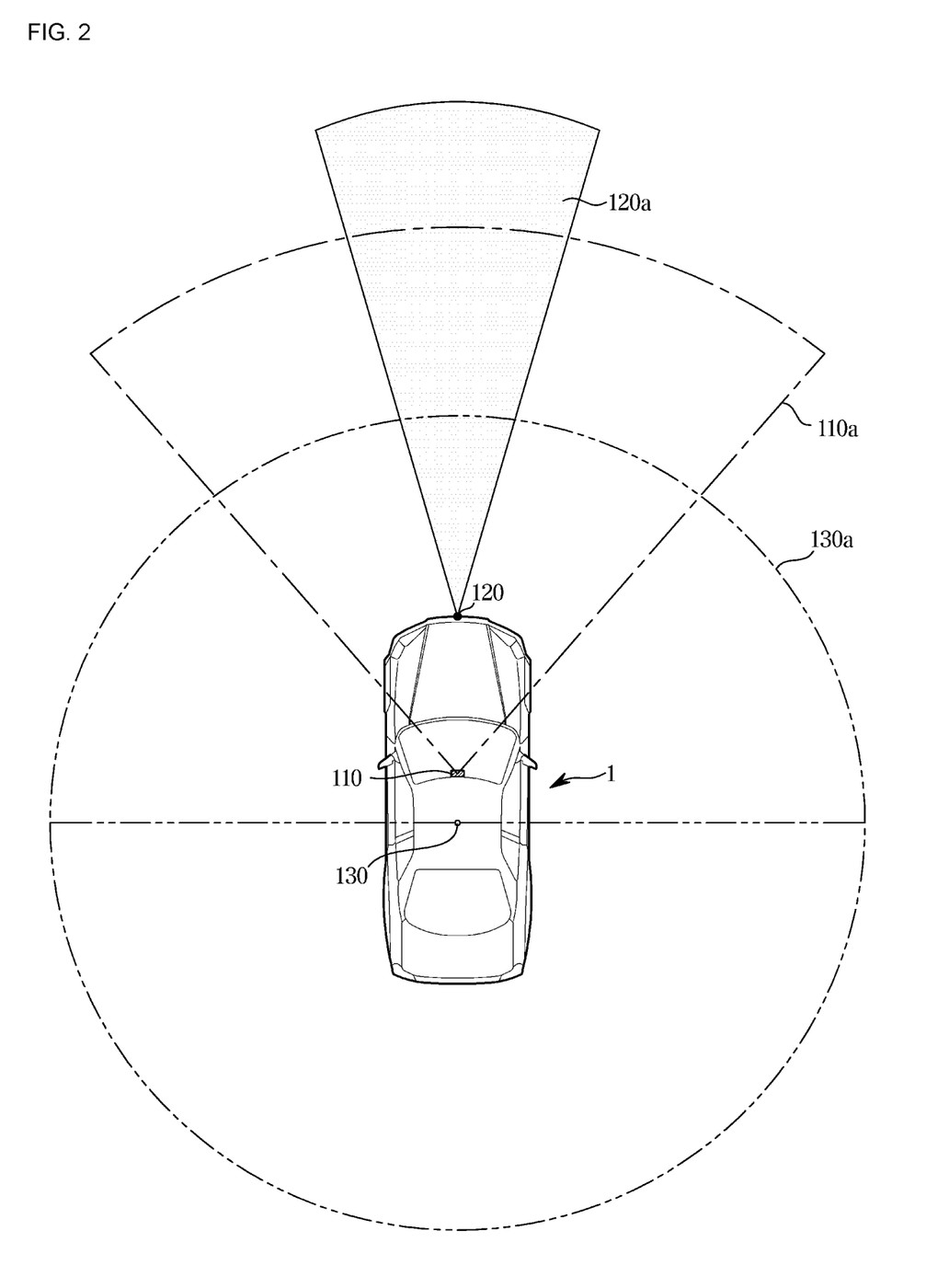
FIG. 2 is a view illustrating a field of view of a camera, radar, and lidar included in the driver assistance device according to the embodiment of the disclosure.

FIG. 1 is a view illustrating a configuration of a vehicle according to an embodiment of the disclosure. FIG. 2 is a view illustrating field of views of a camera, radar, and a light detection and ranging (lidar) included in apparatus for assisting driving of a vehicle according to an embodiment of the disclosure.

As shown in FIG. 1, a vehicle 1 may include a navigation device 10, a driving device 20, a braking device 30, a steering device 40, a display device 50, an audio device 60, and/or a driver assistance device 100 (also referred to as an apparatus for assisting driving). Furthermore, the vehicle 1 may further include sensors 91, 92, and 93 for detecting a dynamic of the vehicle 1. For example, the vehicle 1 may further include a vehicle speed sensor 91 for detecting a longitudinal speed of the vehicle 1, an acceleration sensor 92 for detecting longitudinal and lateral acceleration of the vehicle 1, and/or a gyro sensor 93 for detecting a yaw rate, a roll rate, and a pitch rate of the vehicle 1.

The above sensors may communicate with each other via a communication network (NT) for a vehicle. For example, electronic devices 10, 20, 30, 40, 50, 60, 91, 92, 93, and 100 included in the vehicle 1 may exchange data through Ethernet (Ethernet), Media Oriented Systems Transport (MOST), Flexray, Controller Area Network (CAN), Local Interconnect Network (LIN), and the like.

The navigation device 10 may generate a route to a destination input by a driver and provide the generated route to the driver. The navigation device 10 may receive a Global Navigation Satellite System (GNSS) signal from GNSS and identify an absolute position (coordinate) of the vehicle 1 based on the GNSS signal. The navigation device 10 may generate the route to the destination based on the location (coordinates) of the destination input by the driver and the current location (coordinates) of the vehicle 1.

The navigation device 10 may provide map data and location information of the vehicle 1 to the driver assistance device 100. Furthermore, the navigation device 10 may provide information on the route to the destination to the driver assistance device 100. For example, the navigation device 10 may provide information such as a distance to an access road for the vehicle 1 to enter a new road or a distance from a road on which the vehicle 1 is currently traveling to an exit road, to the driver assistance device 100.

The driving device 20 moves the vehicle 1 and may include, for example, an engine, an engine management system (EMS), a transmission, and a transmission control unit (TCU). The engine generates power for driving the vehicle 1, and the EMS may control the engine in response to a driver's intention to accelerate through an accelerator pedal or a request from the driver assistance device 100. The transmission decelerates and transmits the power generated by the engine to wheels of the vehicle, and the TCU may control the transmission in response to a driver's shift instruction through a shift lever and/or a request from the driver assistance device 100.

The braking device 30 stops the vehicle 1, and may include, for example, a brake caliper and an electronic brake control module (EBCM). The brake caliper may decelerate the vehicle 1 or stop the vehicle 1 by using friction with a brake disc, and the EBCM may control the brake caliper in response to a driver's intention to brake through the brake pedal and/or a request from the driver assistance device 100. For example, the EBCM receives a deceleration request including a deceleration degree from the driver assistance device 100, and electrically or hydraulically may control the brake caliper to decelerate the vehicle 1 depending on the requested deceleration degree.

The steering device 40 may include an Electronic Power Steering Control (EPS) Module. The steering device 40 may change a driving direction of the vehicle 1, and the EPS module assist operation of the steering device 40 so that a driver may easily manipulate a steering wheel in response to a driver's intention to steer through the steering wheel. Furthermore, the EPS module may control the steering device in response to a request from the driver assistance device 100. For example, the EPS module may receive a steering request including a steering torque from the driver assistance device 100 and control the steering device to steer the vehicle 1 depending on the requested steering torque.

The display device 50 may include a cluster, a head-up display, a center fascia monitor, and the like, and may provide various information and entertainment to the driver through images and sounds. For example, the display device 50 may provide driving information and a warning message of the vehicle 1 to the driver.

The audio device 60 may include a plurality of speakers, and may provide various information and entertainment to the driver through sound. For example, the audio device 60 may provide driving information of the vehicle 1, a warning message, and the like to the driver.

The driver assistance device 100 may communicate with the navigation device 10, the plurality of sensors 91, 92, and 93, the driving device 20, the braking device 30, the steering device 40, and the display device 50, and the audio device 60, via the NT. The driver assistance device 100 may receive information on a route from the navigation device 10 to the destination and location information of the vehicle 1, and obtain information regarding the vehicle speed, acceleration, and/or an angular velocity of the vehicle 1 from the plurality of sensors 91, 92, and 93.

The driver assistance device 100 may provide various functions for safety to the driver. For example, the driver assistance device 100 may include lane departure warning (LDW), lane keeping assist (LKA), high beam assist (HBA), and autonomous emergency braking (AEB), traffic sign recognition (TSR), adaptive cruise control (ACC), and blind spot detection (BSD), and the like.

The driver assistance device 100 may include a camera 110, a radar 120, a lidar 130, and a controller 140. The driver assistance device 100 is not limited to that illustrated in FIG. 1. For example, in the driver assistance device 100 shown in FIG. 1, at least one detecting means among the camera 110, the radar 120, and the lidar 130 is omitted or various detecting means capable of detecting surrounding objects of the vehicle 1 may be added.

The camera 110, the radar 120, the lidar 130, and the controller 140 may be provided separately from each other. For example, the controller 140 may be installed in a housing separated from a housing of the camera 110, a housing of the radar 120, and a housing of the lidar 130. The controller 140 may exchange data to and from the camera 110, the radar 120, or the lidar 130 through a wide bandwidth network.

The camera 110 may photograph the surroundings of the vehicle 1 and obtain image data around the vehicle 1. For example, the camera 110 may be installed on a front windshield of the vehicle 1 as shown in FIG. 2, and may have a field of view 110a facing the front of the vehicle 1.

The camera 110 may include a plurality of lenses and image sensors. The image sensors may include a plurality of photodiodes that convert light into an electrical signal, and the plurality of photodiodes may be arranged in a two-dimensional matrix.

The image data may include information on other vehicles, pedestrians, cyclists, or lanes (markers for distinguishing lanes) located around the vehicle 1.

The camera 110 may include a graphic processor that processes image data, and may detect objects around the vehicle 1 based on the processing of the image data. The camera 110 may generate a track representing an object using, for example, image processing, and classify the tracks. For example, the camera 110 may identify whether the tracks are any other vehicle, a pedestrian, a cyclist, and the like.

The camera 110 may be electrically connected to the controller 140. For example, the camera 110 may be connected to the controller 140 through the NT, connected to the controller 140 through a hard wire, or connected to the controller 140 through a printed circuit board (PCB). The camera 110 may transmit image data (or a location and classification of the tracks) around the vehicle 1 to the controller 140.

The radar 120 may transmit a transmitted wave toward surroundings of the vehicle 1 and detect a surrounding object of the vehicle 1 based on a reflected wave reflected from the surrounding object. For example, the radar 120 may be installed on a grille or a bumper of the vehicle 1 as shown in FIG. 2, and have a field of sensing 120a facing the front of the vehicle 1.

The radar 120 may include a transmission antenna (or transmission antenna array) that radiates a transmitted wave toward surroundings of the vehicle 1, and a reception antenna (or reception antenna array) that receives the reflected wave reflected by the object.

The radar 120 may obtain radar data from the transmission wave transmitted by the transmission antenna and the reflected wave received by the reception antenna. The radar data may include location information (e.g., distance information) and/or speed degree of the objects positioned in front of the vehicle 1.

The radar 120 may include a signal processor that processes radar data, and may generate a track representing an object by clustering reflection points by the reflected waves. The radar 120 may obtain a distance of the track based on a time difference between a transmission time of the transmitted wave and a reception time of the reflected wave (in other words, the time a radio wave travels from transmission to reception). Furthermore, the radar 120 may obtain a relative speed of the track based on a frequency difference between a frequency of the transmitted wave and a frequency of the reflected wave.

The radar 120 may be connected to the controller 140 through, for example, the NT or the hard wires or the PCB, and transmit radar data (or the distance and relative speed of the track) to the controller 140.

The lidar 130 may transmit light (e.g., infrared rays) toward surroundings of the vehicle 1 and detect a surrounding object of the vehicle 1 based on reflected light reflected from the surrounding object. For example, the lidar 130 may be installed on a roof of the vehicle 1 as shown in FIG. 2, and may have a field of view 130a facing all directions around the vehicle 1.

The lidar 130 may include a light source (e.g., a light emitting diode, a light emitting diode array, a laser diode, or a laser diode array) that emits light (e.g., infrared rays, etc.), and an optical sensor (e.g., a photodiode or a photodiode array) that receives light (e.g., infrared rays, etc.). Furthermore, if necessary, the lidar 130 may further include a driving device for rotating the light source and/or the light sensor.

The lidar 130, while the light source and/or the light sensor rotate, may emit light through the light source and receive the light reflected from the object through the light sensor, thereby obtaining lidar data.

The lidar data may include relative positions (a distance of the surrounding object and/or a direction of the surrounding object) and/or relative velocities of surrounding objects of the vehicle 1. The lidar 130 may include a signal processor capable of processing lidar data, and may generate a track representing an object by clustering reflection points by the reflected light. The lidar 130 may obtain a distance to the object based on a time difference between a light transmission time and a light reception time (in other words, the time light travels from transmission to reception). Furthermore, the lidar 130 may obtain a direction (or an angle) of the object with respect to the driving direction of the vehicle 1 based on the direction in which the light source emits light when the light sensor receives the reflected light.

The lidar 130 may be connected to the controller 140 through, for example, the NT or the hard wires or the PCB, and transmit lidar data (or the relative position and relative speed of the track) to the controller 140.

The controller 140 may be electrically connected to the camera 110, the radar 120, and/or the lidar 130. Furthermore, the controller 140 may be connected to the navigation device 10, the driving device 20, the braking device 30, the steering device 40, the display device 50, and the audio device 60, and/or the plurality of sensors 91, 92, 93, via the NT.

The controller 140 may process the image data of the camera 110, the radar data of the radar 120, and/or the lidar data of the lidar 130, and provide control signals to the driving device 20, the braking device 30, and/or the steering device 40.

The controller 140 may include a processor 141 and a memory 142.

The processor 141 may process the image data of the camera 110, the radar data of the radar 120, and/or the lidar data of the lidar 130. The processor 141, based on processing the image data of the camera 110, the radar data of the radar 120, and/or the lidar data of the lidar 130, may generate a driving signal, a braking signal, and/or a steering signal for controlling the driving device 10, the braking device 20, and/or the steering device 30, respectively.

For example, the processor 141 may include an image processor that processes the image data of the camera 110, a signal processor that processes the radar data of the radar 120, and/or the lidar data of the lidar 130, or a micro control unit (MCU) that generates the driving/braking/steering signals.

The memory 142 may store programs and/or data for the processor 141 to process image data, radar data, and/or lidar data. The memory 142 may also store programs and/or data for processor 141 to generate the driving/braking/steering signals.

The memory 142 may temporarily store the image data received from the camera 110, the radar data received from the radar 120, and/or the lidar data received from the lidar 130, and temporarily store processing results of the image data of the processor 141, the radar data, and/or the lidar data.

The memory 142 may not only volatile memories such as static random access memory (S-RAM) and dynamic random-access memory (D-RAM), but also non-volatile memory such as a flash memory, read-only memory (ROM), erasable programmable read only memory (EPROM), and the like.

As described above, the controller 140 may provide the driving signal, the braking signal, or the steering signal based on the image data of the camera 110, the radar data of the radar 120, or the lidar data of the lidar 130.

A specific operation of the driver assistance device 100 will be described in more detail below.

Figure 3:
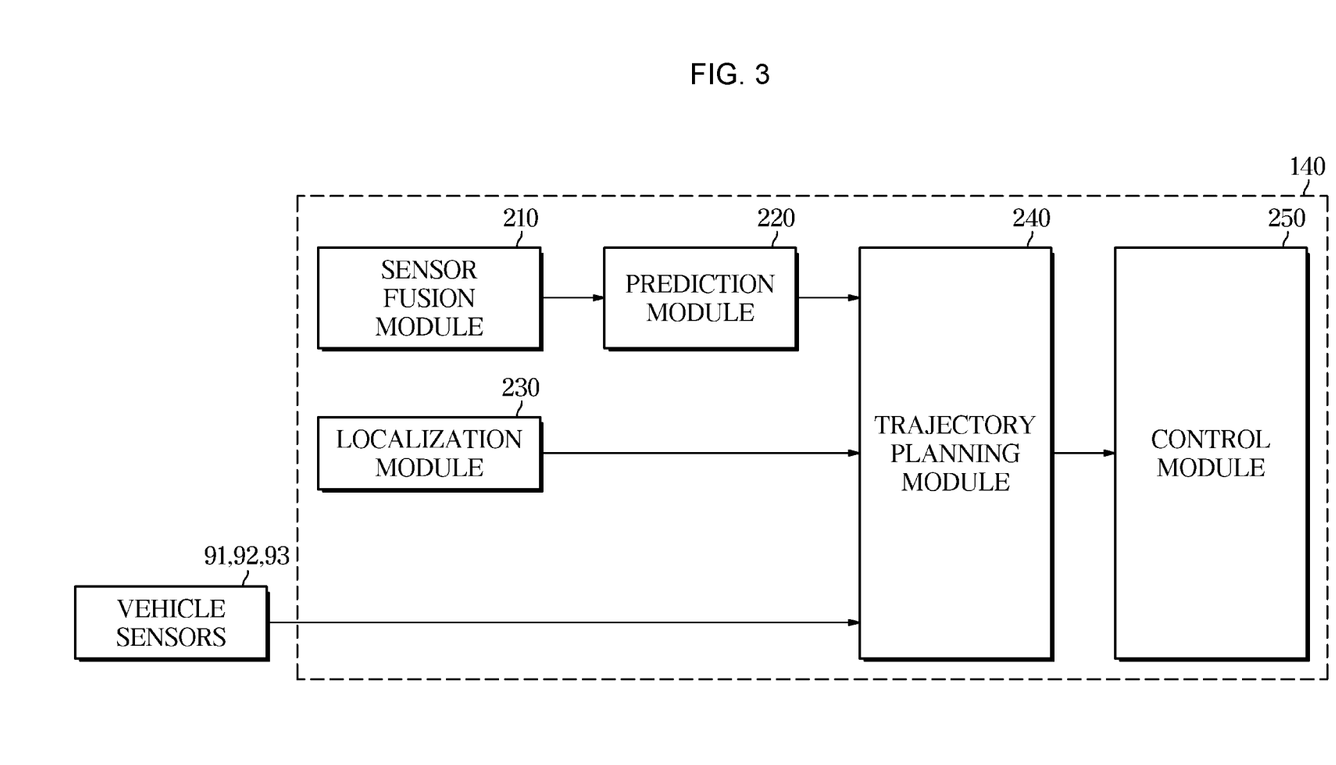
FIG. 3 is a view illustrating function modules of a controller included in the driver assistance device according to the embodiment of the disclosure.
Figure 4:
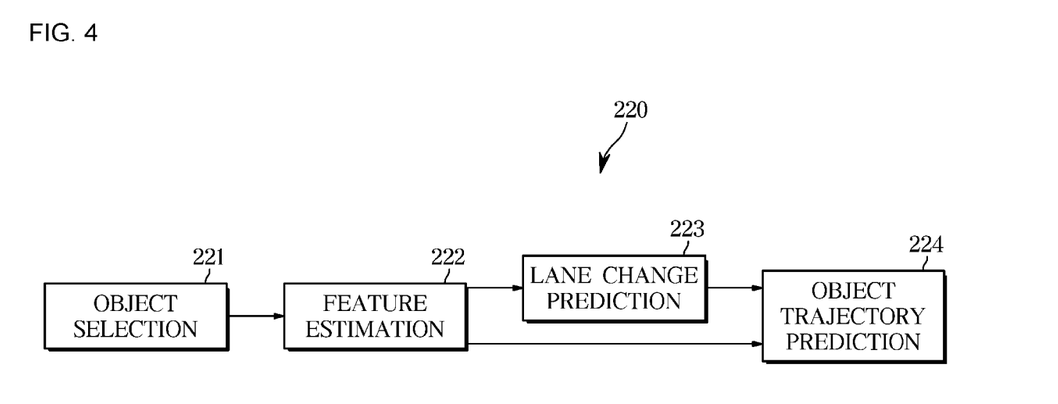
FIG. 4 is a view illustrating a prediction module shown in FIG. 3.
Figure 5A:
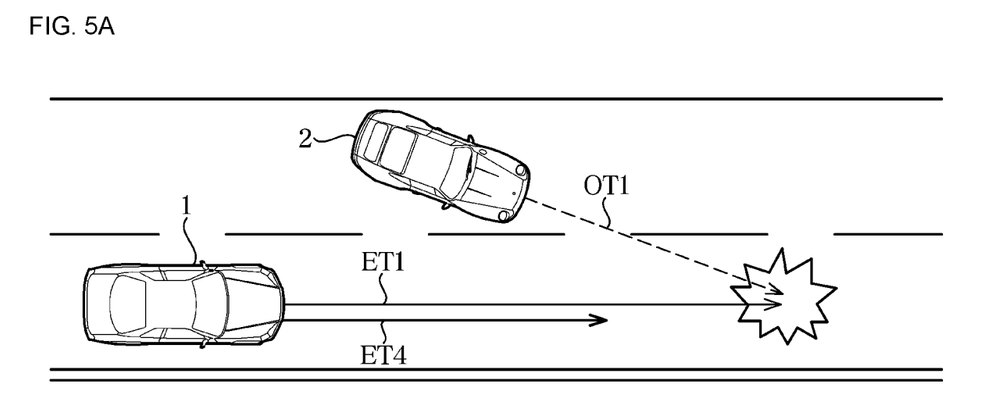
FIGS. 5A to 5C are a view illustrating object trajectories of objects and ego trajectories of a vehicle.
Figure 5B:
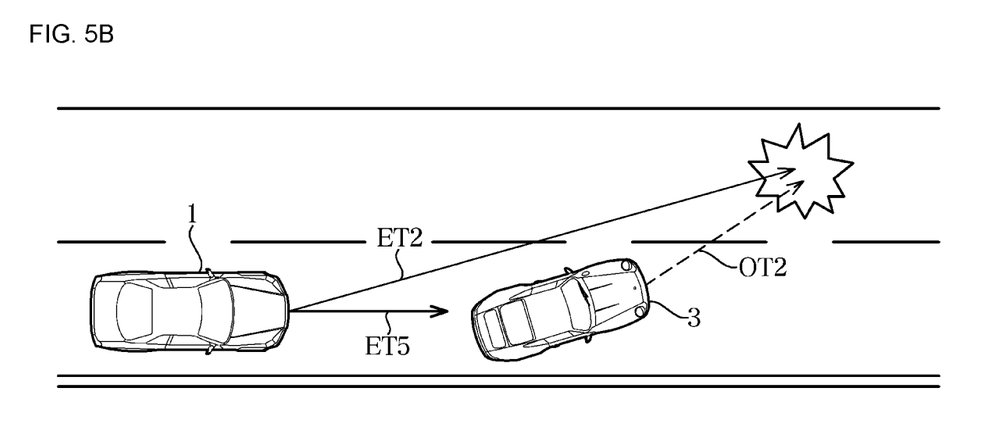
Figure 5C:
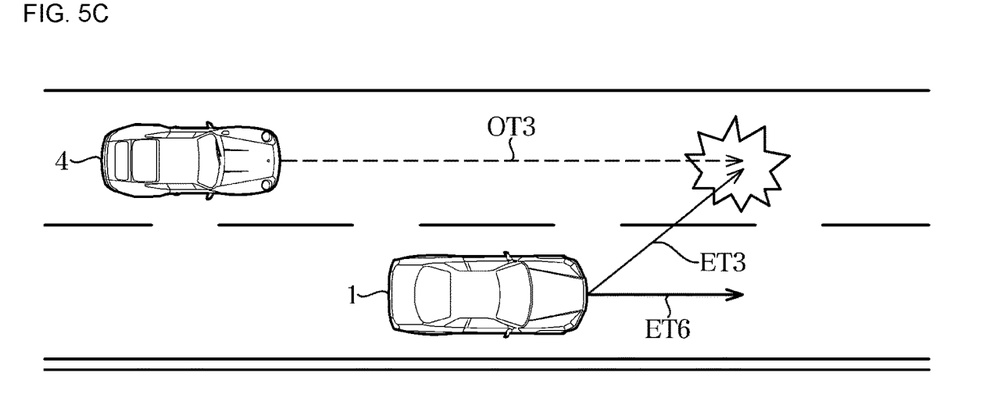

FIG. 3 is a view illustrating function modules of the controller included in the driver assistance device according to an embodiment of the disclosure. FIG. 4 is a view illustrating a prediction module shown in FIG. 3. FIG. 5A is a view illustrating an example in which any other vehicle changes a lane from other lanes to a vehicle lane. FIG. 5B is a view illustrating an example in which any other vehicle changes a lane from the vehicle lane to other lanes. FIG. 5C is a view illustrating an example in which the vehicle changes a lane to a lane of any other vehicle.

As shown in FIGS. 3, 4 and 5, the controller 140 may functionally include a plurality of modules. Each of the modules may be a hardware module (e.g., ASIC or FPGA) included in the processor 141 or a software module (e.g., an application program or data) stored in the memory 142.

The controller 140 may include a sensor fusion module 210, a prediction module 220, a localization module 230, and a trajectory planning module 240, and a control module 250.

The sensor fusion module 210 of the controller 140 may detect the surrounding objects of the vehicle 1 by fusing the image data of the camera 110, the radar data of the radar 120, and the lidar data of the lidar 130.

The sensor fusion module 210 may obtain the relative position (angle with respect to driving direction) of the camera track and/or the classification (e.g., whether the object is any other vehicle, a pedestrian, or a cyclist, etc.) of the camera track from the camera 110. The sensor fusion module 210 may obtain the relative position (a distance from the vehicle) and/or the relative speed of the radar track from the radar 120. Furthermore, the sensor fusion module 210 may obtain the relative position (the distance from the vehicle and/or the angle with respect to driving direction) and/or a relative speed of the lidar track from the lidar 130.

The sensor fusion module 210 may match the camera track, the radar track, and the lidar track with each other, and obtain a common track based on the matching result. For example, the sensor fusion module 210 may identify an overlapping common track among the camera track, the radar track, and the lidar track based on position information of the camera track, position information of the radar track, and position information of the lidar track.

Furthermore, the sensor fusion module 210 may integrate information on the camera track, information on the radar track, and/or information on the lidar track. The sensor fusion module 210 may integrate common track information (e.g., location information and speed information) obtained from the camera 110, common track information (e.g., location information and speed information) obtained from the radar 120, and common track information (e.g., location information and speed information) obtained from the lidar 130.

The sensor fusion module 210 may provide common tracks and information about the common tracks (e.g., information about classification, location, and speed) to the prediction module 220.

The prediction module 220 of the controller 140 may receive information about the common tracks from the sensor fusion module 210 and predict trajectories of the tracks.

As shown in FIG. 4, the prediction module 220 may perform an object selection 221, a feature estimation 222, a lane change prediction 223, and/or an object trajectory prediction 224 for each of the plurality of tracks.

The object selection 221 may include a process of selecting tracks related to driving of the vehicle 1 among the plurality of common tracks. For example, in the object selection 221, the controller 140 may select a track located in the same lane as the lane on which the vehicle 1 travels or a track located in a lane adjacent to the lane on which the vehicle 1 travels from among the plurality of common tracks.

The feature evaluation 222 may include a process of obtaining information capable of predicting a lane change of a track from information of the selected tracks. For example, in the feature evaluation 222, the controller 140 may obtain a lateral position, a lateral speed, an align angle, and the like of the track from among the selected tracks information. Here, the align angle may refer to an angle between the direction of the lane and the direction in which the track moves.

The lane change prediction 223 may include a process of predicting whether a lane of a track is changed based on the information (e.g., lateral position, lateral speed, align angle, etc. of the track) of the track selected by the feature evaluation 222.

In the lane change prediction 223, the controller 140 may predict whether to change the lane of the track based on the lateral position, the lateral speed, and/or the align angle of the track.

For example, as shown in FIG. 5A, the prediction module 220 of the controller 140 may obtain the lateral position, the lateral speed, and/or align angle of the object 2 traveling in a lane adjacent to the lane on which the vehicle 1 travels. The prediction module 220 may predict a first object trajectory OT1 in which the object 2 changes a lane from an adjacent lane to the lane on which the vehicle 1 travels based on the selected information about the object 2.

Furthermore, as shown in FIG. 5B, the prediction module 220 of the controller 140 may obtain the lateral position, the lateral speed, and/or align angle of the object 2 traveling in the same lane on which the vehicle 1 travels. The controller 140 may predict a second object trajectory OT2 in which the track 3 changes a lane from the lane on which the vehicle 1 travels to an adjacent lane based on the selected information about the object 3.

The object trajectory prediction 224, based on information about each of the tracks, may include a lateral trajectory prediction for predicting lateral trajectories of the objects corresponding to the tracks and a longitudinal trajectory prediction for predicting longitudinal trajectories of the objects. For example, in object trajectory prediction 224, the prediction module 220 may predict the lateral trajectory of the object based on the lateral positions, lateral speeds, and/or the align angles of the tracks. Furthermore, the prediction module 220 may predict the longitudinal trajectory of the object based on the longitudinal positions and/or the longitudinal speeds of the tracks.

In the object trajectory prediction 224, the controller 140 may predict the trajectory of each of the objects based on the lateral trajectory and the longitudinal trajectory of each of the objects.

For example, as shown in FIG. 5C, the prediction module 220 may obtain the longitudinal position and longitudinal speed of the object 4 traveling in a lane adjacent to the lane on which the vehicle 1 travels. The prediction module 220 may predict a third object trajectory OT3 in which the object 4 travels without changing the lane in the lane on which the vehicle 1 travels, based on information about the object 4.

As such, the prediction module 220 may provide the predicted trajectory of each of the objects to the trajectory planning module 240.

The localization module 230 of the controller 140 may obtain map data and location information of the vehicle 1 from the navigation device 10. The localization module 230 may identify the location of the vehicle 1 based on the map data and the location information of the vehicle 1. In other words, the controller 140 may identify the absolute coordinates of the vehicle 1. The localization module 230 may provide the map data and the information about the location of the vehicle 1 to the trajectory planning module 240.

The trajectory planning module 240 of the controller 140 may obtain the positions and predicted trajectories of the objects from the prediction module 220, and obtain the map data and the location of the vehicle 1 from the localization module 230.

The trajectory planning module 240 may project the vehicle 1 and/or the objects to the map data based on the positions of the objects and the positions of the vehicle 1. For example, the trajectory planning module 240 may project the vehicle 1 onto the map data based on the location information of the vehicle 1 and project the surrounding objects of the vehicle 1 onto the map data based on the relative positions and/or predicted trajectories of the objects.

The trajectory planning module 240 is, based on the predicted trajectories of the objects, may identify whether the vehicle 1 and the objects collide or not, and generate a trajectory of the vehicle 1 for avoiding collisions with the objects.

The trajectory planning module 240 may obtain information about the dynamics of the vehicle 1, such as vehicle speed, acceleration, and/or angular velocity, from the plurality of sensors 91, 92, and 93. The trajectory planning module 240 may predict the trajectory of the vehicle 1 based on the vehicle speed, acceleration, and/or angular velocity of the vehicle 1. For example, the trajectory planning module 240 of the controller 140 may predict a first ego trajectory ET1 in which the vehicle 1 continues to travel in the current lane.

Furthermore, the trajectory planning module 240 may obtain information about a route from the navigation device 10 to the destination. The trajectory planning module 240 may generate the trajectory of the vehicle 1 according to the route to the destination. For example, as shown in FIGS. 5B and 5C, the trajectory planning module 240 may generate a second ego trajectory ET2 and a third ego trajectory ET3 in which the vehicle 1 changes a lane to an adjacent lane based on the route to the destination.

The trajectory planning module 240 may identify whether the predicted object trajectories OT1, OT2, and OT3 of the objects 2, 3, and 4 overlap or interfere with the ego trajectories ET1, ET2, and ET3 of the vehicle 1.

As described above, the trajectory planning module 240 may project the vehicle 1 onto the map and project the objects 2, 3, and 4. The trajectory planning module 240 may project the ego trajectories ET1, ET2, and ET3 of the vehicle 1 and the predicted object trajectories OT1, OT2, and OT3 of the objects 2, 3 and 4, as well as the vehicle 1 and the objects 2, 3 and 4, onto the map. The trajectory planning module 240 may identify whether the ego trajectories ET1, ET2, and ET3 of the vehicle 1 overlap or interfere with the predicted object trajectories OT1, OT2, and OT3 of the objects 2, 3, 4 on the coordinate system of the map.

The trajectory planning module 240, based on that the ego trajectory ET1, ET2, and ET3 of the vehicle 1 overlaps or interferes with the predicted object trajectory OT1, OT2, and OT3 of the object 2, 3, 4, may generate an ego trajectory of a new vehicle 1 that does not interfere with the predicted object trajectories OT1, OT2, and OT3 of the objects 2, 3, and 4.

For example, as shown in FIG. 5A, the trajectory planning module 240 may generate a fourth ego trajectory ET4 that does not interfere with the first object trajectory OT1. In the fourth ego trajectory ET4, a driving distance is shorter than that of the first ego trajectory ET1 and deceleration of the vehicle 1 is required.

Furthermore, as shown in FIG. 5B, the trajectory planning module 240 may generate a fifth ego trajectory ET5 that does not interfere with the second object trajectory OT2. In the fifth ego trajectory ET5, a driving is required in the current lane without changing the lane compared to the second ego trajectory ET2.

Furthermore, as shown in FIG. 5C, the trajectory planning module 240 may generate a sixth ego trajectory ET6 that does not interfere with the third object trajectory OT3. In the sixth ego trajectory ET6, the driving and deceleration are required in the current lane without changing the lane compared to the third ego trajectory ET3.

The control module 250 of the controller 140 may include a driving control for controlling the driving device 20, a braking control for controlling the braking device 30, and a steering control for controlling the steering device 40.

The control module 250 may generate a driving signal, a braking signal, or a steering signal to follow the selected ego trajectories ET4, ET5, and ET6.

For example, the control module 250 may provide the braking signal to the braking device 30 so that the vehicle 1 is decelerated to follow the fourth ego trajectory ET4 as shown in FIG. 5A. The control module 250 may provide the driving signal to the driving device 20 so that the vehicle 1 maintains the current speed in order to follow the fifth ego trajectory ET5 as shown in FIG. 5B. Furthermore, the control module 250 may provide the braking signal to the braking device 30 so that the vehicle 1 is decelerated to follow the sixth ego trajectory ET6 as shown in FIG. 5C.

As described above, the driver assistance device 100 may obtain the information about the surrounding objects and predict the trajectories of the surrounding objects. The driver assistance device 100 compares the predicted (or generated) trajectory of the vehicle 1 with the predicted trajectories of surrounding objects on one coordinate system and thus identify whether the predicted (or generated) trajectory of the vehicle 1 interfere with the predicted trajectories of surrounding objects. The driver assistance device 100 may change the trajectory of the vehicle 1 based on the predicted (or generated) trajectory of the vehicle 1 interfering with the predicted trajectories of surrounding objects.

Figure 6:
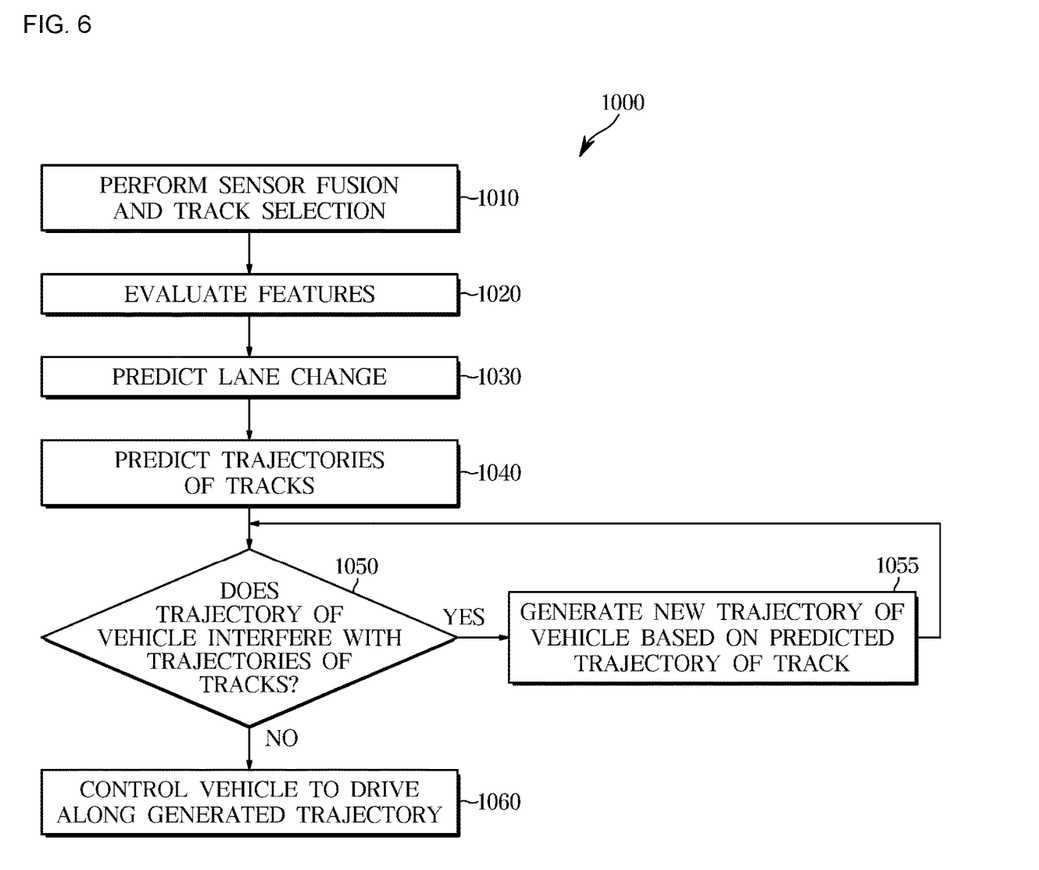
FIG. 6 is a view illustrating operation of the driver assistance apparatus according to the embodiment of the disclosure.

FIG. 6 is a view illustrating operation of the driver assistance apparatus according to an embodiment of the disclosure.

Referring to FIG. 6, an operation 1000 of the driver assistance device 100 is described.

The driver assistance device 100 performs a sensor fusion and a track selection (1010).

The controller 140 may detect the surrounding objects of the vehicle 1 by a fusion of the image data of the camera 110, the radar data of the radar 120, and the lidar data of the lidar 130. The controller 140 may match the camera track, the radar track, and the lidar track with each other, and obtain the common track based on the matching result.

The controller 140 may select the tracks related to the driving of the vehicle 1 from among the plurality of common tracks. For example, the controller 140 may select the track located in the same lane as the lane on which the vehicle 1 travels or the track located in the lane adjacent to the lane on which the vehicle 1 travels from among the plurality of common tracks.

The driver assistance device 100 evaluates the features of the tracks (1020).

The controller 140 may obtain information for predicting a lane change of a track from among information on the selected tracks. For example, the driver assistance device 100 may obtain the lateral position, the lateral speed, the align angle, and the like of the track from among information on the selected tracks.

The driver assistance device 100 predicts the lane change of tracks (1030).

The controller 140 may predict whether to change the lane of the tracks based on the selected track information (e.g., the lateral position, the lateral speed, the align angle, etc. of the tracks).

The driver assistance device 100 predicts the trajectories of the tracks (1040).

The controller 140 may predict the lateral trajectory of the objects corresponding to the track based on information about each of the tracks, and may predict the longitudinal trajectory of the objects. For example, the controller 140 may predict the lateral trajectory of the object based on the lateral positions, lateral speeds, and/or align angles of the tracks. Furthermore, the controller 140 may predict the longitudinal trajectory of the object based on the longitudinal positions and/or longitudinal speeds of the tracks.

The controller 140 may predict the trajectory of each of the objects based on the lateral trajectory and longitudinal trajectory of each of the objects.

The driver assistance device 100 identifies whether the trajectory of the vehicle 1 interferes with the trajectories of the tracks (1050).

The controller 140 may project the vehicle 1 and/or the objects onto the map data based on the positions of the tracks and the position of the vehicle 1. Furthermore, the controller 140 may project the ego trajectory of the vehicle 1 and the predicted trajectory of the track together with the vehicle 1 and the track on the map.

The controller 140 may identify whether the trajectory of the vehicle 1 overlaps or interferes with the predicted trajectory of the track on the coordinate system of the map.

When the trajectory of the vehicle 1 interferes with the trajectory of the track (YES in 1050), the driver assistance device 100 generates a new trajectory of the vehicle 1 based on the predicted trajectory of the track (1055).

The controller 140 may generate a trajectory of the vehicle 1 that does not interfere with the trajectory of the track based on the trajectory of the vehicle 1 interfering with the trajectory of the track.

Furthermore, the controller 140 may identify whether the new trajectory of the vehicle 1 interferes with the trajectory of the track.

When the trajectory of the vehicle 1 does not interfere with the trajectory of the track (NO in 1050), the driver assistance device 100 controls the vehicle 1 to drive along the generated trajectory (1060).

The controller 140 may generate the driving signal, the braking signal, or the steering signal based on the trajectory of the vehicle 1, and provide the driving signal, braking signal, or steering signal to the driving device 20, braking device 30, or steering device 40.

As such, the driver assistance device 100 compares the predicted trajectories of the surrounding objects with the predicted (or generated) trajectory of the vehicle 1 on one coordinate system, and thus may generate a trajectory of the vehicle 1 that does not interfere with the predicted trajectory of the tracks.

As is apparent from the above, embodiments of the disclosure may provide an apparatus and method for assisting driving of a vehicle capable of predicting the trajectories of the plurality of objects located in the vicinity of the vehicle.

Accordingly, the apparatus for assisting driving of the vehicle may predict and avoid various dangerous situations caused by the objects other than the target.

On the other hand, embodiments of the disclosure may be implemented in the form of a recording medium storing instructions executable by a computer. Instructions may be stored in the form of program code, and when executed by a processor, may create a program module to perform the operations of the embodiments of the disclosure. The recording medium may be implemented as a computer-readable recording medium.

The computer-readable recording medium includes any type of recording medium in which instructions readable by the computer are stored. For example, there may be a read only memory (ROM), a random access memory (RAM), a magnetic tape, a magnetic disk, a flash memory, an optical data storage device, and the like.

The device-readable storage medium may be provided in the form of a non-transitory storage medium. Herein, the non-transitory refers to that the storage medium is a tangible device and does not include a signal (e.g., electromagnetic wave), and this term does not distinguish between a case in which data is stored semi-permanently in the storage medium and a case in which data is temporarily stored therein. For example, the non-transitory storage medium may include a buffer in which data is temporarily stored.

Embodiments of the disclosure have thus far been described with reference to the accompanying drawings. It should be apparent to those of ordinary skill in the art that the disclosure may be practiced in other forms than the embodiments as described above without changing the technical idea or essential features of the disclosure. The above embodiments are only by way of example, and should not be interpreted in a limited sense.

What is claimed is:

1. An apparatus for assisting driving of a vehicle, comprising:
   a camera installed in the vehicle, the camera having a field of view around the vehicle and obtaining image data; and
   a controller configured to process the image data;
   wherein the controller is configured to:
   generate an ego trajectory of the vehicle based on a route to a destination obtained from a navigation device of the vehicle,
   determine whether the vehicle is going to change the vehicle's lane based on the ego trajectory,
   identify at least one object located around the vehicle based on processing the image data,
   determine whether the at least one object is going to change the at least one object's lane based on a lateral position, a lateral speed, and an align angle, the align angle being an angle between a direction of the object lane and a direction in which the at least one object moves,
   predict a lateral trajectory of the at least one object based on at least one of the lateral speed, a lateral acceleration, and the align angle of the at least one object,
   predict a longitudinal trajectory of the at least one object based on a longitudinal speed and a longitudinal acceleration of the at least one object, and
   predict an object trajectory of the at least one object based on at least one of the lateral trajectory and the longitudinal trajectory, and
   project the ego trajectory and the predicted object trajectory on one coordinate system,
   identify, when it is determined that the vehicle is going to change the vehicle's lane to a target lane and the at least one object is going to change the at least one object's lane to the same target lane, whether the ego trajectory and the object trajectory interfere each other on the one coordinate system,
   update the ego trajectory of the vehicle based on an interference between the predicted object trajectory of the at least one object and the ego trajectory of the vehicle, and
   control at least one of a driving device, a braking device, and a steering device of the vehicle based on the updated trajectory of the vehicle.

2. The apparatus of claim 1, wherein the controller is further configured to:
   identify at least one of the lateral speed, the lateral acceleration, the align angle, the longitudinal speed, and the longitudinal acceleration of the at least one object based on the processing of the image data.

3. The apparatus of claim 1, wherein the controller is further configured to predict the ego trajectory of the vehicle based on at least one of a speed, an acceleration, or an angular velocity of the vehicle.

4. The apparatus of claim 1, wherein the controller is further configured to update the ego trajectory of the vehicle to avoid the object trajectory of the at least one object in response to that the ego trajectory of the vehicle interferes with the object trajectory of the at least one object.

5. The apparatus of claim 1, further comprising a radar installed in the vehicle, the radar having a field of view around the vehicle and obtaining radar data;
wherein the controller is further configured to:
identify at least one object located around the vehicle based on processing the radar data, and
integrate the at least one object based on the processing the image data and the at least one object based on the processing the radar data.

6. The apparatus of claim 5, wherein, when a plurality of objects are detected based on processing the image data, the controller selects, from among the plurality of detected objects, objects traveling in the vehicle's lane or in an adjacent lane to the vehicle's lane as the at least one object located around the vehicle.

7. A method of assisting driving of a vehicle, the method comprising:
obtaining image data by a camera installed in the vehicle and having a field of view around the vehicle;
generating an ego trajectory of the vehicle based on a route to a destination obtained from a navigation device of the vehicle,
determining whether the vehicle is going to change the vehicle's lane based on the ego trajectory,
identifying at least one object located around the vehicle based on processing of the image data by a processor installed in the vehicle; and
determining whether the at least one object is going to change the at least one object's lane based on a lateral position, a lateral speed, and an align angle, the align angle being an angle between a direction of the object lane and a direction in which the at least one object moves,
predicting a lateral trajectory of the at least one object based on at least one of the lateral speed, a lateral acceleration, and the align angle of the at least one object,
predicting a longitudinal trajectory of the at least one object based on a longitudinal speed and a longitudinal acceleration of the at least one object, and
predicting an object trajectory of the at least one object based on at least one of the lateral trajectory and the longitudinal trajectory, and
projecting the ego trajectory and the predicted object trajectory on one coordinate system,
identifying, when it is determined that the vehicle is going to change the vehicle's lane to a target lane and the at least one object is going to change the at least one object's lane to the same target lane, whether the ego trajectory and the object trajectory interfere each other on the one coordinate system,
updating the ego trajectory of the vehicle based on an interference between the predicted object trajectory of the at least one object and the ego trajectory of the vehicle; and
controlling at least one of a driving device, a braking device, or a steering device of the vehicle based on the updated trajectory of the vehicle.

8. The method of claim 7, further comprising:
identifying at least one of the lateral speed, the lateral acceleration, the align angle, the longitudinal speed, and the longitudinal acceleration of the at least one object based on the processing of the image data.

9. The method of claim 7, further comprising:
predicting the ego trajectory of the vehicle based on at least one of a speed, an acceleration, or an angular velocity of the vehicle.

10. The method of claim 7, further comprising:
updating the ego trajectory of the vehicle to avoid the object trajectory of the at least one object in response to that the ego trajectory of the vehicle interferes with the object trajectory of the at least one object.

11. The method of 10, further comprising:
obtaining radar data by a radar installed in the vehicle and having a field of view around the vehicle;
identifying at least one object located around the vehicle by the processor based on processing the radar data, and
integrate the at least one object based on the processing the image data and the at least one object based on the processing the radar data.

12. A computer-readable storage medium storing a program for executing the method of claim 7.

* * * * *